Patented June 17, 1947

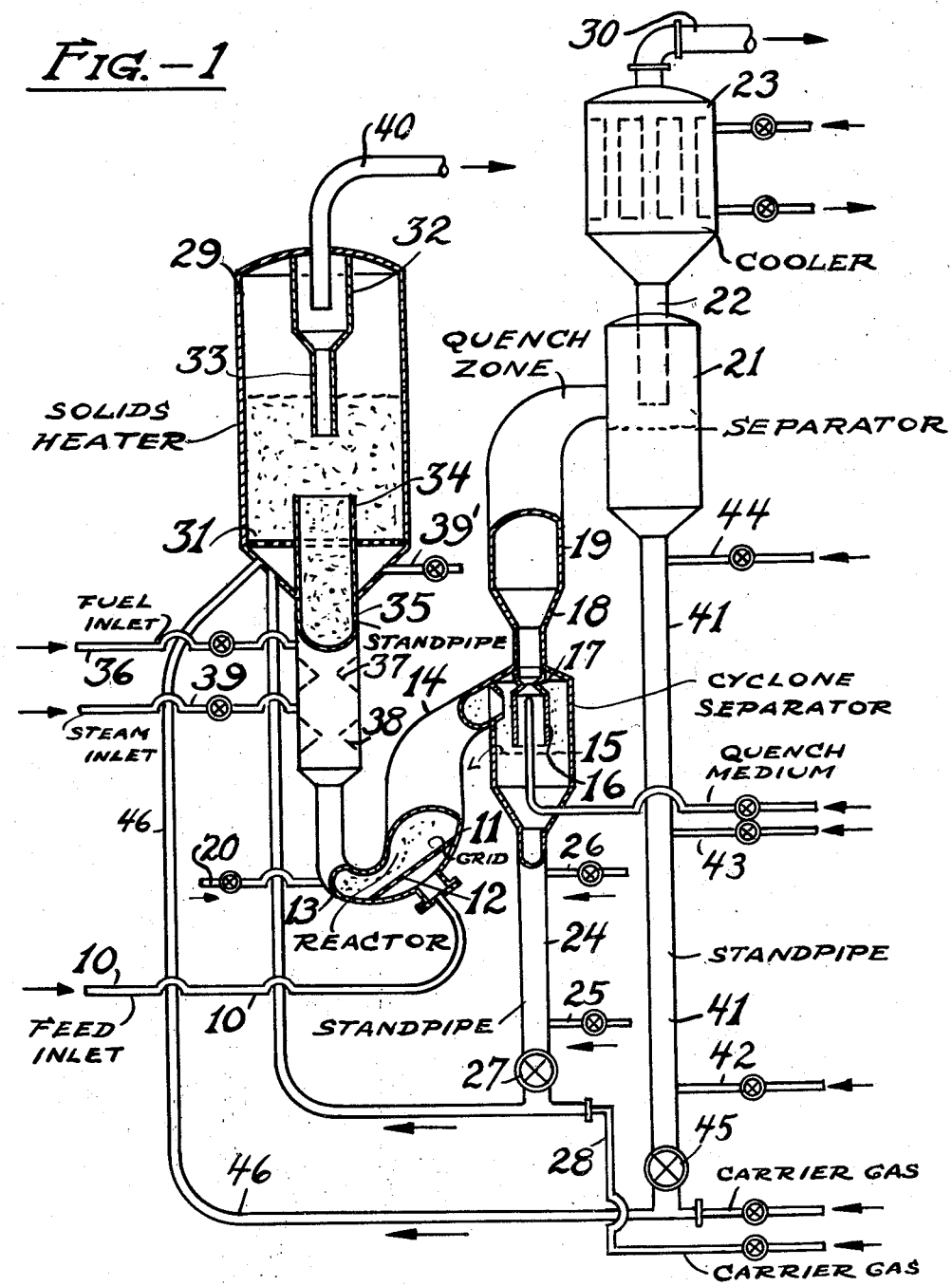

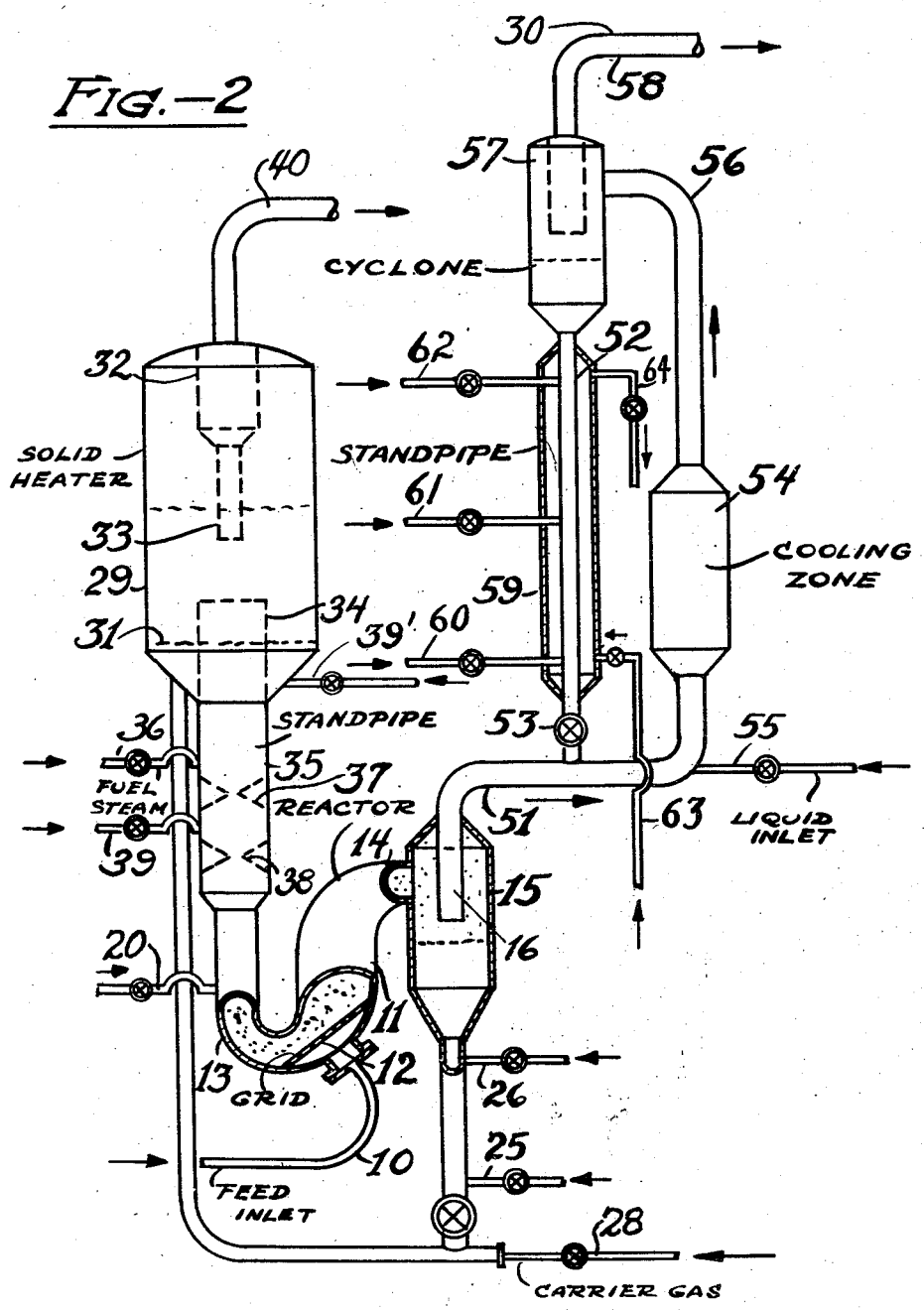

2,422,501

UNITED STATES PATENT OFFICE 2,422,501

APPARATUS FOR CARRYING OUT CHEMICAL REACTIONS IN THE PRESENCE OF FINELY-DIVIDED POWDER

Bruno E. Roetheli, Cranford, N. J., assignor to Standard Oil Development Company, a corporation of Delaware Application December 8, 1944, Serial No. 567,277

4 Claims. (Cl. 23—262)

This invention relates to carrying out chemical reactions in the presence of finely-divided solids, and pertains more particularly to processes requiring high temperatures and extremely short reaction times.

While the invention in some of its broader phases has a more general application, it is particularly adapted for the high temperature cracking of hydrocarbon gases and vapors to form acetylene, ethylene, and other low-molecular weight olefinic hydrocarbons and hydrogen.

It has previously been known that acetylene could be formed from hydrocarbon vapors by exposing the vapors to extremely high temperatures, such as of the order of from 1800° F. to 2600° F., for extremely short reaction periods. If the vapors are left exposed to the high temperatures for prolonged periods, however, undesirable secondary reactions take place.

One of the practical difficulties which thus far has not been successfully overcome is getting heat into and out of the vapors in an extremely short period of time. One method heretofore employed involved passing the hydrocarbon vapors through an electric arc and immediately quenching the vapors with cooled oil or gas. While this method permits rapid heating and cooling, it has thus far proven too expensive to compete successfully with the calcium carbide process for the production of acetylene.

Other proposals for producing acetylene from hydrocarbon vapors involved passing the vapors through radiant tubes or in contact with highly heated checker brick. The latter requires frequent interruption of the process for reheating the bricks, since the reaction is highly endothermic. None of these processes thus far has proven successful for large scale operations.

One of the objects of the present invention is to provide an improved method for carrying out chemical reactions requiring high temperatures and extremely short reaction periods.

Another related object is to provide an improved process for rapidly heating and rapidly cooling vapors or gaseous reactants.

Another object is to provide an improved apparatus for carrying out chemical reactions requiring high temperatures and short reaction times.

Another more specific object is to provide an improved method and apparatus for rapidly cooling gaseous reaction products.

Other specific objects and advantages of the invention will be apparent from the detailed description hereinafter in which reference will be made to the accompanying drawings wherein—

Fig. 1 is a partly schematic and partly diagrammatic illustration of an apparatus forming a part of the present invention and capable of carrying out the method phases of the invention; and Fig. 2 is a similar view showing a modification of a method of quenching or cooling gaseous reaction products.

In accordance with the present invention, the gases to be reacted are introduced into the bottom of a reaction zone which is maintained at the desired high reaction temperature by the continuous introduction of a highly heated powder. The reaction products are quickly withdrawn from the reaction zone together with the powder and immediately discharged into a cyclone separator in which the swirling motion of the gases and powder around the outer shell of the cyclone effects rapid separation of the bulk of the powder from the reactant gases. The gases are withdrawn from the cyclone through a central tube and the separated powder discharges into a hopper forming the bottom section of the cyclone separator.

In accordance with one phase of the present invention, a quenching medium in the form of a solid, liquid or gas is injected into the central duct of the cyclone separator so that the gaseous reactants immediately following separation of the bulk of the powder are rapidly cooled to a temperature which will avoid or reduce undesirable secondary reactions. By quenching the reactant gases immediately following the primary separation of the powder used for supplying the heat, the powder may be circulated with a minimum loss of heat and less quenching medium will be required.

According to another modification of the invention, as illustrated in Fig. 2, the reaction products following separation from the powder are immediately quenched by injecting a cooled powder, and the resulting mixture may or may not thereafter be passed through further cooling elements.

The reactant gases after being allowed to contact with the quenching medium may discharge into a secondary separator wherein further separation of entrained powder from the reactant gases may be effected. In event the finely-divided powder comprises part or all of the quenching medium, the secondary separator may be used for effecting separation of the quenching powder.

In other cases where a gaseous or liquid quenching medium is employed and the powder employed as a heat carrier is relatively inexpensive, the secondary separator may be omitted. The reaction products following the initial quenching treatment may be passed through further cooling zones wherein they are subjected to additional cooling preparatory to final separation and purification of the desired reaction products.

The hot powder separated from the gaseous reaction products is passed through a heater wherein it is heated to a temperature sufficient to heat the feed vapors to the desired reaction temperature and also to supply the heat of reaction. The heated powder is then returned to the reaction zone wherein it imparts its heat to the feed vapors. The rate of circulation of the powder through the heating zone and reaction zone is maintained sufficiently rapid to hold a substantially uniform temperature within the reaction zone. This requires the circulation of relatively large quantities of powder. In order to restore the pressure lost during circulation, a standpipe is placed either in the line for returning the powder from the reaction zone to the heating zone or in the line for returning the powder from the heating zone to the reaction zone, or a separate standpipe may be provided in each line. These standpipes are adapted to contain a column of powder of a height sufficient to restore the pressure lost in other sections of the circulating system, such as in the heating zone and reaction zone. In order to generate a maximum pressure at the base of the column and avoid packing and bridging of the powder within the column, it is important to maintain the powder within the column in a fluid state. This can be done by maintaining a small amount of an aerating or fluidizing gas in admixture with the powder within the column. It is known that powders may be made to behave in many respects as a liquid by maintaining a small amount of a gas in intimate mixture therewith. When maintained in a fluidized state by the presence of a small amount of gas, a hydrostatic pressure may be generated at the base of the column. The use of standpipes for restoring pressure on the catalysts provides a simple and inexpensive means for circulating relatively large quantities of powder through the cracking and heating zones.

Control valves for regulating the flow of powder through the heating and reaction zones are preferably located in the cooler sections of the equipment, such as in the lines leading from the reaction zone into the heating zone.

In order to maintain a seal between the heating zone and the reaction zone and thus prevent the feed vapors from leaking back through the powder transfer line into the heating zone, the transfer line may be provided with one or more fixed orifices through which the powder must pass. Steam or other inert gas may be introduced below the orifices or between the orifices, in event two are employed, so as to further insure the maintenance of a proper seal between the heating and reaction zones by maintaining powder in the fluid state.

The heating of the powder is preferably carried out in an enlarged zone through which a heating gas is passed upwardly at a regulated velocity to maintain the powder in a highly turbulent state. This insures that the powder passing to the reaction zone will be at substantially uniform temperature. In view of the high temperature of the reaction, which, as previously mentioned, may be of the order of from 1800° F. to 2600° F., all parts of the equipment of sufficient diameter should be internally lagged with refractories. Other portions of the equipment exposed to high temperature may be constructed of heat-resisting alloys.

The powder used as the heat carrier may comprise any refractory material, such as brick dust, carborundum powder, purified sand, silica gel, and powdered metals or alloys. The powder employed may be inert to the reaction carried out or, if desired, the powder may comprise or contain catalytic agents.

Having set forth the general nature and objects, the invention will now be described with reference to the drawings.

Referring to Fig. 1, the reference character 10 designates a charge line through which the feed gas or vapors are introduced into the system. For illustrative purposes, the invention will be described as applied to the cracking of hydrocarbon gases or vapors to form acetylene and ethylene.

The feed vapors or gases introduced through line 10 discharge into the bottom portion of a reactor 11 below a grid 12 through which the vapors are distributed over the full cross-sectional area of the reactor. The vapors passing through the grid 12 immediately contact a stream of highly heated powder which discharges into the reactor 11 through a conduit 13. The amount and temperature of the powder introduced into the reactor are sufficient to heat the gases or vapors to the desired temperature and to supply the necessary heat for the reaction. The feed vapors prior to introduction into the reactor may be preheated to a temperature below decomposition temperature, such as from 500° F. to 1500° F., and the amount and temperature of the catalyst may be sufficient to heat the vapors to a reaction temperature, such as from 1800° F. to 2600° F. The gases or vapors rising through the reactor 11 carry the heated powder therewith and the mixture of powder and reaction products is withdrawn from the upper end of the reactor through conduit 14 directly into a cyclone separator 15.

The size of the reactor 11 and the velocity of the gases or vapors passing therethrough are controlled so that the time of residence of the vapors or gases within the reaction zone is extremely short. This residence time may, for example, range between one-hundredth of a second to 2 seconds. The reaction products and powder discharge into the cyclone separator 15 in a tangential manner to set up a swirling motion in the outer section of the cyclone and thus throw the powder to the outer surface. The powder so separated falls into the bottom of the cyclone which forms a hopper for the collection of the powder separated from the gases. A central duct 16 of the cyclone serves to withdraw the reactant gases therefrom.

In accordance with one phase of the present invention, there is injected into this central duct a quenching medium in the form of a vaporizable liquid, solid or gas in sufficient amounts to quench the reaction products immediately to a temperature which will avoid or reduce undesirable secondary reactions. The central duct 16 may be provided with a throat 17 at the point of discharge of the quenching medium to increase turbulence and improve mixing. The reactant vapors together with the quenching medium are removed from the cyclone separator 15 through a conduit 18 and pass into a quenching zone 19 wherein the vapors are retained for a sufficient period to insure lowering the temperature to the desired level. This temperature may, for example, be of the order of from 500° F. to 1500° F., depending upon the nature of the products made. The reactant gases after passing through the quenching zone 19 may discharge into a secondary cyclone separator 21 wherein any entrained powder not removed in the primary separator 15 may be further separated. The powder separated in the separator 21 is collected in the bottom portion thereof and the reactant gases together with the quenching medium are withdrawn through a central duct 22. These products may be passed through a further heat exchanger 23 which may be an indirect heat exchanger, as shown, or a direct heat exchanger for reducing the temperature of the products preparatory to final separation and purification. Reaction products are removed from the heat exchanger 23 through line 30.

The powder separated from the main reactant stream in the initial cyclone 15 discharges into the top of a vertical conduit 24 which serves as a standpipe for restoring a part or all of the pressure on the powder being circulated. If desired, a small amount of an aerating or fluidizing gas may be introduced into the conduit 24 at one or more spaced points through lines 25 and 26. The powder discharges from the base of the standpipe 24 through a control valve 27 into a stream of carrier gas passing through line 28 and is transferred into the bottom portion of a heater 29.

The powder separated from the reaction products under the conditions above described will normally contain a substantial amount of combustible deposits which may be burned in the heater 29 to supply heat to the powder. The carrier gas in such case may comprise air.

The heating chamber 29 is preferably in the form of a vertical vessel having an inverted conical bottom into which the stream of powder and carrier gas discharges. A grid plate 31 may be provided in the bottom portion of the vessel for distributing the powder and gas uniformly over the full cross-sectional area of the heater. The velocity of the air stream rising through the heater 29 is preferably maintained sufficiently low to cause primary separation of the powder from the air and form a relatively dense body of powder in the bottom portion of the heating vessel. Under properly controlled conditions a relatively dense, turbulent, fluid layer of powder may be maintained in the bottom portion of the heating vessel superimposed by a relatively dilute phase of gases containing entrained powder. This powder will be maintained in a highly turbulent state by the gases rising therethrough. The combustion gases are withdrawn from the upper portion of the heating vessel 29 through an internal cyclone separator 32 wherein entrained powder carried over with the combustion gases is separated and returned to the heating vessel through conduit 33. The combustion gases are withdrawn from the cyclone separator 32 through a conduit 40 and may be passed to suitable heat recovery equipment such as a waste heat boiler which, for reasons of simplicity, has not been shown on the drawing.

The heating vessel 29 may be provided with an upwardly extending conduit 34 which projects upwardly into the vessel above the grid 31 for withdrawing the heated powder. The powder discharges downwardly through the conduit 34 into a conduit 35 which may comprise an extension of the conduit 34 located in the vessel 29. If desired, a fuel gas may be discharged into the conduit 35 through line 36 to supply additional heat to the powder. This also acts as a fluidizing gas. The conduit 35 is preferably provided with spaced fixed orifices 37 and 38 between which a stream of steam or other sealing gas may be introduced through line 39. The conduit 35 discharges at the base into the conduit 13 which leads to the reaction chamber 11. The powder is heated in the heating vessel 29 to a temperature substantially above the temperature maintained in the reactor 11, and the rate of circulation of the powder through the heating and reaction zones is preferably maintained sufficient to hold a relatively uniform temperature in the reactor.

Additional fuel in the form of a solid, liquid, or gas may be introduced into the heater 29 through line 39' in event the amount of carbon contained on the powder is insufficient.

If desired, a fluidizing gas, which in this case may comprise a portion of the feed, may be introduced into the conduit 13 through line 20 to maintain the powder passing into the reactor 11 in a fluid state.

The powder separated in the secondary cyclone 21 also discharges into the top of a vertical conduit 41 which forms a standpipe for restoring the pressure on the powder. To this end, an aerating gas may be introduced into the standpipe 41 at one or more spaced points through lines 42, 43 and 44. The powder discharges from the base of the standpipe 41 through a control valve 45 into a stream of carrier gas passing through line 46 and is introduced into the base of the heater 29.

Fig. 2 illustrates an alternate method of quenching the reaction products. The heating vessel and the reaction zone are of the same construction as that shown in Fig. 1 and like reference characters have been used for designating similar parts. In place of introducing a quenching medium into the central conduit of the cyclone separator 15, as shown in Fig. 1, the quenching is accomplished in Fig. 2 by introducing a cool powder into the reactant stream.

Referring to Fig. 2, the hot, gaseous reaction products separated from the powder in the cyclone separator 15 are withdrawn through a conduit 51 into which a stream of cool powder is introduced from the base of a vertical standpipe 52 at a controlled rate through valve 53. The amount and temperature of the powder introduced into the conduit 51 may be sufficient to quench the reaction products to a temperature sufficient to avoid undesirable secondary reactions, or the resulting mixture of cooled powder and gaseous reaction products may be passed upwardly through a cooling zone 54 wherein further cooling may be effected, such as by the injection of a vaporizable liquid through line 55. If desired, the cooling may be effected by providing cooling tubes in the cooling chamber 54. The cooled mixture of gaseous reaction products and powder is withdrawn from the cooling zone 54 through conduit 56 which discharges into a cyclone separator 57 wherein the cooled powder is separated from the cooled reaction products. The gaseous reaction products may be withdrawn through conduit 58 and may be passed to additional coolers such as shown in Fig. 1 for reducing the temperature of the reactant gases preparatory to further separation and purification. The powder separated from the reactant gases in the cyclone 57 discharges into the top of the vertical standpipe 52 where it is reintroduced into the conduit 51 for further cooling of the reaction products.

The standpipe 52 may be surrounded by a cooling jacket 59, or cooling elements may be introduced interiorly of the standpipe 52 for further cooling the powder introduced into the conduit 51. A fluidizing gas may be introduced into the standpipe 52 at one or more points through lines 60, 61 and 62. A cooling fluid may be introduced into the jacket 59 surrounding the standpipe 52 through line 63 and removed through line 64. In some cases the amount and temperature of the cooler powder introduced into the conduit 51 may be sufficient to lower the temperature of the reaction products to the desired extent. In the latter case the cooling zone 54 and the introduction of the vaporizable liquid through line 55 may be omitted. In this event, the powder will be subjected to the necessary cooling following separation of the powder from the cooled reaction gases.

In most cases it is preferable not to quench the products below the dew point of the vapors being quenched. In some cases sufficient condensation may be obtained to separate or scrub entrained powder from the reactant gas.

Having set forth in detail the nature and objects of my invention and the preferred mode of operation, it will be understood that it is not limited to the exact details illustrated and described, as other obvious modifications will be apparent to those skilled in the art.

What is desired to be protected by Letters Patent is:

1. An apparatus for processing gaseous material at high temperatures for short reaction periods comprising a vertical reaction chamber, a conduit connected with one end of said chamber for introducing the gases to be reacted, means including a separate conduit for introducing a stream of hot powder into said reaction chamber, a third conduit in open communication with the end of said reaction chamber opposite said first-named end for withdrawing a mixture of powder and gaseous reaction products from said chamber, means immediately adjacent the last-named end of said chamber for separating powder from said gaseous reaction products, means for injecting a cooling medium into said gaseous reaction products immediately following separation of the powder therefrom, a separate heating chamber adapted to heat the powder to a temperature materially above the temperature maintained in said reaction chamber, means for transferring powder separated from said gaseous reaction products to said heating chamber, said first-named separate conduit being in open communication with said heating chamber and adapted to effect transfer of heated powder from said heating chamber directly to said reaction chamber, a plurality of fixed orifices arranged at spaced points within said separate conduit adapted to restrict the passage of powder between said heating chamber and said reaction chamber, and means for introducing a sealing gas between said orifices.

2. The apparatus defined by claim 1 wherein the means for transferring the powder separated from said reaction products to said heating chamber includes a standpipe adapted to contain a column of powder of a height sufficient to restore pressure lost on the powder circulated through said heating chamber and said reaction chamber, and means for maintaining the column of powder within said standpipe in a fluid state capable of generating a hydrostatic pressure at the base thereof.

3. The apparatus defined by claim 1 wherein the means for transferring the powder separated from said reaction products to said heating chamber comprises a standpipe adapted to contain a column of powder of a height sufficient to restore the pressure lost during circulation of the powder through said heating and reaction chambers, means for maintaining the powder within said column in a free flowing fluidized state capable of generating a hydrostatic pressure at the base thereof and a valve at the base of said standpipe for controlling the rate of flow of said powder through said heating and reaction chambers.

4. An apparatus for processing gaseous materials at high temperatures for short reaction periods comprising a vertical reaction chamber, a conduit connected with one end of said chamber for introducing gases to be reacted, a separate conduit connected to said chamber for introducing highly heated powder therein, a third conduit opposite said first-named conduit for withdrawing a mixture of powder and gaseous reaction products from said chamber, means immediately adjacent said last-named end of said chamber for separating powder from said hot gaseous reaction products, means for immediately cooling said gaseous reaction products following the separation of the powder therefrom, a heating chamber adapted to heat said powder materially above the temperature maintained in said reaction chamber, said first-named separate conduit being in open communication with said heating zone and adapted to transfer the heated powder directly from said heating chamber to said reaction chamber, a plurality of restricted orifices positioned within said separate conduit, means for introducing a sealing gas between said orifices to effect a gaseous seal between said heating chamber and said reaction chamber, and means for passing powder separated from said gaseous reaction products to said heating zone whereby said powder may be continuously circulated through said heating and reaction chambers.

BRUNO E. ROETHELI.

REFERENCES CITED

The following references are of record in the file of this patent:

UNITED STATES PATENTS

| Number | Name | Date |
| --- | --- | --- |
| 2,259,487 | Payne | Oct. 21, 1941 |
| 2,300,152 | Hemminger | Oct. 27, 1942 |
| 2,303,047 | Hemminger | Nov. 24, 1942 |
| 2,304,128 | Thomas | Dec. 8, 1942 |
| 2,331,433 | Simpson et al. | Oct. 12, 1943 |
| 2,367,281 | Johnson | Jan. 16, 1945 |
| 2,341,193 | Scheineman | Feb. 8, 1944 |
| 2,362,621 | Fahnestock | Nov. 14, 1944 |
| 2,366,805 | Richker | Jan. 9, 1945 |
| 2,373,358 | Upham et al. | Apr. 10, 1945 |
| 2,376,190 | Roetheli et al. | May 15, 1945 |